United States Patent
Stoiber

(10) Patent No.: US 8,069,545 B2
(45) Date of Patent: Dec. 6, 2011

(54) METHOD FOR CHANGEOVER OF A BLOW MOLDING MACHINE

(75) Inventor: Christian Stoiber, Michelsneukirchen (DE)

(73) Assignee: Krones AG, Neutraubling (DE)

( * ) Notice: Subject to any disclaimer, the term of this patent is extended or adjusted under 35 U.S.C. 154(b) by 501 days.

(21) Appl. No.: 12/321,018

(22) Filed: Jan. 15, 2009

(65) Prior Publication Data

US 2009/0178264 A1 Jul. 16, 2009

(30) Foreign Application Priority Data

Jan. 16, 2008 (DE) .................. 10 2008 004 773

(51) Int. Cl.
*B23P 17/00* (2006.01)
*B23P 23/00* (2006.01)
*B21K 21/16* (2006.01)

(52) U.S. Cl. ....... 29/401.1; 425/151; 425/182; 425/540; 425/541; 29/402.08; 29/426.1

(58) Field of Classification Search .................. 29/401.1, 29/402.3, 402.8, 463, 426.1; 425/182, 195, 425/526, 540, 541, 151
See application file for complete search history.

(56) References Cited

U.S. PATENT DOCUMENTS

| | | | |
|---|---|---|---|
| 4,035,463 A | 7/1977 | Rosenkranz et al. | |
| 4,233,010 A * | 11/1980 | Suzuki | 425/143 |
| 4,299,549 A * | 11/1981 | Suzuki et al. | 425/214 |
| 6,113,377 A * | 9/2000 | Clark | 425/195 |
| 6,447,281 B1 | 9/2002 | Petre | |
| 6,613,262 B1 * | 9/2003 | Arend | 264/255 |
| 6,918,754 B2 | 7/2005 | Albrecht | |
| 7,335,007 B2 * | 2/2008 | Perez et al. | 425/195 |
| 2003/0124212 A1 * | 7/2003 | Petre | 425/195 |
| 2007/0286920 A1 * | 12/2007 | Netsu | 425/526 |
| 2009/0136613 A1 * | 5/2009 | Linke et al. | 425/541 |

FOREIGN PATENT DOCUMENTS

| | | |
|---|---|---|
| DE | 69127084 | 1/1998 |
| DE | 10 2005 035 233 A1 | 4/2007 |
| DE | 102007005489 | 7/2007 |
| EP | 0572107 B1 | 9/1996 |
| EP | 1276598 B1 | 11/2001 |
| WO | WO 2007/012308 A1 | 2/2007 |

* cited by examiner

*Primary Examiner* — David Bryant
*Assistant Examiner* — Matthew Beisel
(74) *Attorney, Agent, or Firm* — Simpson & Simpson, PLLC

(57) ABSTRACT

A method for changeover of a blow molding machine without a long dead time is disclosed. The blow molding machine includes a plurality of blow mold holders, each of which carries a multi-part blow mold. At least one part of the blow mold is connected with a media supply. At first, at least two working areas are being assigned at the blow molding machine. Different processes are carried out at each working area. The blow mold holder is opened at least at the first working area and/or the media supplies are released. The parts of the blow mold are removed from the blow mold holder at a second working area and are replaced with a blow mold of another type.

19 Claims, 7 Drawing Sheets

METHOD FOR CHANGEOVER OF A BLOW MOLDING MACHINE

CROSS REFERENCE TO RELATED APPLICATIONS

This patent application claims priority of German Patent Application No. 10 2008 004 773.2, filed on Jan. 16, 2008, the application is incorporated herein by reference.

FIELD OF THE INVENTION

The present invention relates to a method for changeover of a blow molding machine. In particular, the invention relates to a method for changeover of a blow molding machine which comprises a plurality of blow mold holders. Each blow mold holder carries a multi-part blow mold,. At least one blow mold is connected with a media supply.

BACKGROUND OF THE INVENTION

A blow molding machine is being particularly used for stretch blow molding of preforms. The blow molding machine itself comprises at least one blow mold. For the stretch blow molding of preforms for plastic bottles blow molds are being used, in which a preform is being blown into shape, which means being outlined, in the inside of the blow mold with excess pressure. The blow mold can comprise for example two half-molds, which are pivotable about a common axis. By pivoting about this axis, said half-molds can be closed so that a cavity is formed inside the blow mold, which is limited by the two half-molds, and a preform can be formed therein. European patent EP 1 276 598 B1 discloses, for example, the embodiment of such a blow mold holder.

European patent EP 0 572 107 B1 discloses a work head changer for a rotary vessel processing system. The rotary vessel processing system comprises a pivotable body for transporting containers within a defined interval. Likewise, a plurality of work heads is provided which are situated at the circumference of the pivotable body in the same separation distance, in order to treat each container, which is transported by means of the pivotable body, in a treatment process. The treatment process can comprise, for example, a process for attaching caps or a filling process. A connection between the pivotable body and each work head is being provided in order to mount each work head in a removable way on the pivotable body. The work head changer comprises a control system for controlling the rotation of the pivotable body so that each work head is being stopped consecutively and in turn at a predetermined work head exchanging device. Likewise, a work head feeding mechanism is provided which carries out the exchanging step at the corresponding work head changer for removing a work head. After the work head had been removed, a new work head can be placed into the provided empty position.

German patent application DE 10 2005 035 233 A1 discloses a holding device for blow mold segments. The blow mold segments are arranged in a support element. Thereby, the blow mold segments are detachably fixed in the support element with at least one locking element. For each blow mold segment, the locking element is provided with both a positively locking retention and a non-positively locking retention. For exchanging the blow mold segments, the support element must be opened in such a way so that the corresponding processes for the exchange of the blow mold segments must be carried out in one position only.

SUMMARY OF THE INVENTION

The object of the invention is to provide a method which enables a changeover of a blow mold machine in such a way that the changeover time for the changeover of the blow mold machine is reduced to a minimum.

The above-mentioned object is solved by a method for changeover of a blow molding machine in which the blow molding machine has a plurality of blow mold holders, each of which carries a multi-part blow mold. At least one part of the blow mold is connected with a media supply, including the steps of:

assigning at least two working areas at the blow molding machine. Different processes are carried out at each working area;

opening the blow mold holder and releasing the media supply prior to the arrival or at a first working area;

removing the parts of the blow mold from the blow mold holder at a second working area and replacing the parts of the blow mold with a blow mold of another type; and closing the blow mold holders and connecting the media supply.

It is advantageous if at least two working areas are provided for the changeover of a blow molding machine and different processes are carried out at each working area for the changeover of the blow molding machine. For the changeover of the blow molding machine, the blow mold holder is opened and/or the intended media supplies with the blow mold holder and blow mold elements respectively are released at least at the first working area. At a second working area the multi-part blow molds are removed from the blow mold holder and replaced with a blow mold of another type. Finally the blow mold holder is closed and/or the media supply is reconnected. It is also possible that the blow mold holder is opened at a respective working area before the blow mold holder arrives. Likewise, the blow mold can be closed after leaving the working area. A cam element can be used for this, for example.

An expenditure of time for carrying out the processes at the plurality of working areas is assessed in such a way that the expenditure of time is equal at each working area. The advantage is that there are no holding times when the blow mold holders are exchanged at least from the first working area to the second working area. Holding times are necessary only if the processes at all working areas are finished except for one working area. The exchanging process has to wait for the 'slowest' working area.

The expenditure of time at the at least first working area for opening the blow mold holders and for releasing the media supplies is substantially equal with the expenditure of time for removing the blow mold, replacing the blow mold and closing the blow mold holder, and connecting the media supply.

It is particularly advantageous if at least three working areas are provided. The blow mold holder is opened and the media supply is released at a first working area. At a second working area, the multi-part blow mold is removed from the blow mold holder and replaced with a blow mold of another type. At a third working area, the blow mold holders are closed and the media supply is reconnected.

It is also possible to release the fastening of the blow mold parts at the first working area. At the third working area, the fastening elements of the blow mold parts can be tightened again. It is also possible to release and tighten the fastenings of the blow mold parts at that working area at which the blow mold parts are replaced with blow mold parts of another type.

If two working areas are provided for the replacement of the blow molds and for the changeover of the blow molding machine respectively, in one embodiment, the expenditure of time at the first working area is equal with the expenditure of time at the first and second working area respectively. As a matter of course, the expenditure of time at the first working area is reduced if the blow mold holders are opened before they arrive at the first working area. Likewise, the expenditure of time is reduced for a working area if the blow mold holder is not closed in the working area provided for closing the blow mold holder.

It is of advantage if the intended processes are carried out automatically at each working area. It is also possible for the intended processes to be carried out automatically at each working area except for the one working area at which the blow mold is removed and the blow mold is replaced. The removing of the blow mold and the replacement of the blow mold are carried out manually.

At least one robot is provided at a corresponding working area for carrying out the processes automatically. At least some portions of the processes, which are necessary for the changeover of the blow molding machine, are carried out automatically by the robot.

Experience has shown that the expenditure of time for carrying out the processes at each working area should range between 20 and 60 seconds.

It is of advantage when the processes for the changeover of a blow molding machine are carried out simultaneously at different working areas in order to obtain a corresponding saving of time for the changeover of a blow molding machine and consequently reduce the dead time of a blow molding machine during the changeover. The changeover of the blow mold holders from the first working area to the second working area is adjusted in such a way that a cycle time goes according to the longest expenditure of time needed at a working area.

The blow mold holders are arranged at a transport device and the transport device moves the blow mold holders between the working areas according to the cycle time.

The transport device can be designed in a linear way. It is also possible that the transport device is designed in the shape of a wheel and the wheel carries the plurality of blow mold holders.

If only the blow mold of another type is to be inserted and the height of the bottle to be blown remains the same, only a first blow mold half, a second blow mold half and a base part of the blow mold are exchanged at the working area at which the blow mold of another type is to be inserted. Furthermore, in some cases only the first blow mold half and the second blow mold half need to be exchanged, since the base part remains the same, too. This is frequently used when standard bases are used for relatively simple bottles.

If not only the type of the blow mold is being changed but also the height of the bottle to be blown, then a first blow mold half, a second blow mold half, a base part of the blow mold and a stop for the stretching rod are exchanged at the working area at which the blow mold of another type is inserted.

In one embodiment the blow mold parts are exchanged only in case the lockings for the corresponding blow mold parts had been released on the blow mold holders. Accordingly, the locking is to be closed again after the parts had been inserted into the blow mold holder. The process can be carried out automatically or manually. Another embodiment is that the blow mold parts at the blow mold holder are first of all fastened without being locked and that the locking takes place by means of closing the blow mold holder. Likewise, the locking is being opened when the blow mold holder is being opened. It is obvious for a skilled person how to fasten and/or release the separate blow mold parts in the blow mold holder.

BRIEF DESCRIPTION OF THE DRAWINGS

Embodiments of the present invention will now be explained in greater detail on the basis of the accompanying figures, in which.

DETAILED DESCRIPTION OF THE INVENTION

It is to be understood that the described three working areas in the following description of the method for changeover of a blow molding machine should not be regarded as limiting the invention. It is self-evident for a skilled person to provide a blow molding machine with less than three working areas and with more than three working areas at which the changeover of a blow molding machine can be carried out. It is also to be understood that the number of parts of the blow mold or the stop for the stretching rod (not shown), which are to be exchanged, are not to be regarded as limiting the invention. The following description relates to blow mold parts which are connected with a media supply. This is, however, only one of many embodiments. Depending on the requirements of the plastic bottle to be produced, all blow mold parts are provided with a media supply or at least a particular part of the blow mold is provided with a media supply. Furthermore, it is pointed out that same reference numbers refer to the same elements throughout the various figures.

Figure 1:
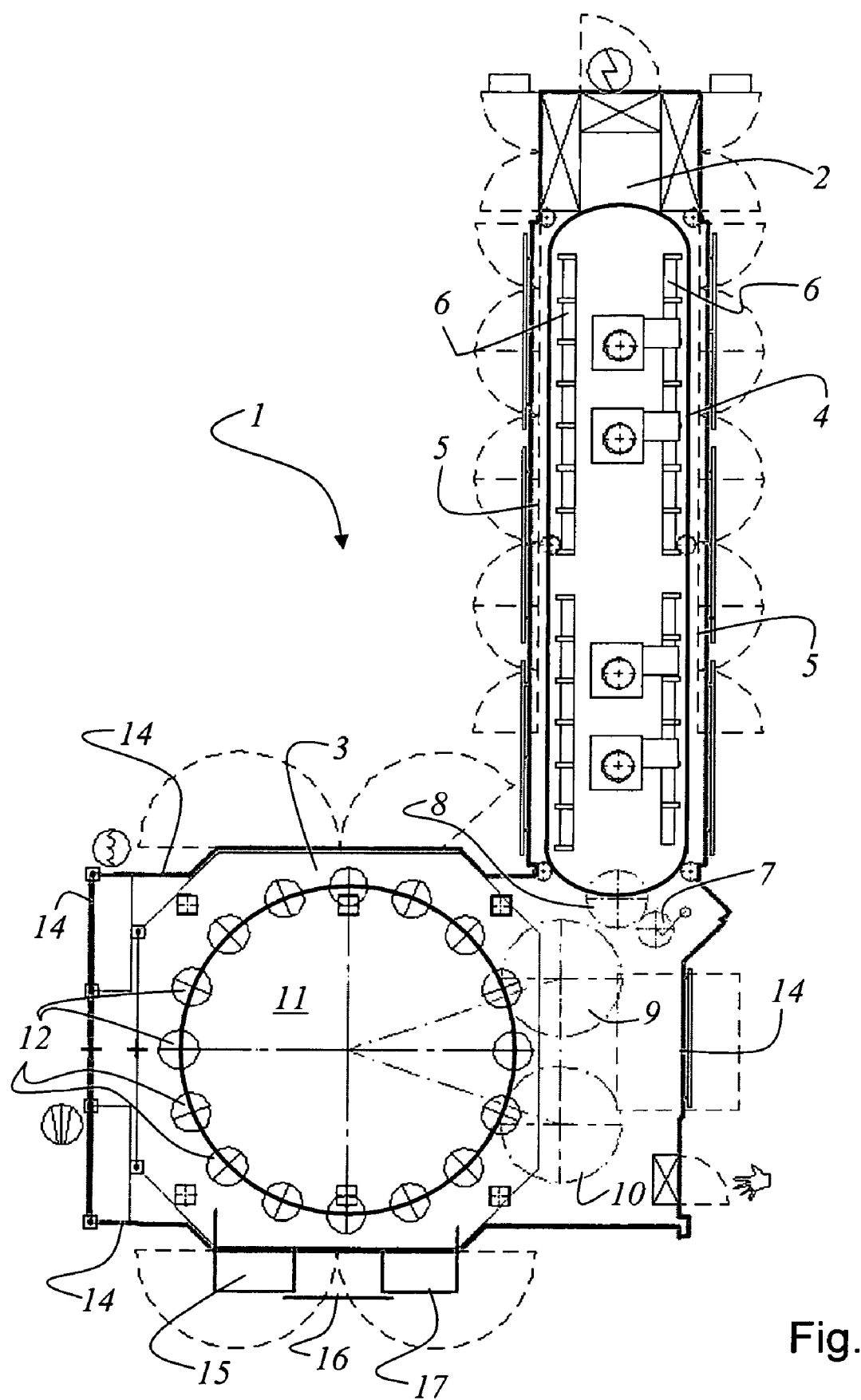
FIG. 1 shows a schematic view of a blow molding machine connected with a heating system, which supplies the blow molding machine with preforms having a defined temperature.

FIG. 1 shows a schematic view of a device with which plastic bottles can be basically produced by means of a stretch blow molding process. The device 1 basically includes a heating system 2 in which preforms for the plastic bottles to be produced are heated to a certain temperature so that plastic bottles can be produced from this preforms in the blow molding process or stretch blow molding process. The blow molding machine 3 is attached to the heating system 2. Inside the heating system 2, a transport device 4 is provided which transports a plurality of preforms past a heating device 5. The transport device 4 is shielded with heat reflective tiles 6 to the inside of the heating system 2. The preforms are being transported into the heating system 2 at a transfer point 7. The heated preforms are being handed over at an output position 8 to an input position 9 for the blow molding machine 3. The finished plastic bottles are being handed over to further processing or filling (not shown) at an output position 10 of the blow molding machine.

The blow molding machine shown in FIG. 1 comprises a transport device 11 onto which the plurality of blow mold holders 12 is arranged. The transport device 11 is designed in the shape of a wheel in this schematic view of the blow molding machine 3. It is also possible that the transport device 11 is basically designed in a linear way. The blow molding machine 3 is surrounded by several walls 14. A first working area 15, a second working area 16 and a third working area 17 are provided on at least one wall 14 of the blow molding machine 3 as shown in this embodiment. At these working areas 15, 16, 17, the changeover of the blow molding machine 3 can be carried out. As already mentioned, the changeover of the blow molding machine 3 can be carried out automatically at each working area 15, 16, 17. For this automatic process of the changeover of the blow molding machine 3, particular robots or conventional handling devices (not shown) are intended for. It is also possible that the changeover of the blow molding machine 3 can be carried out manually at one or at the other working area. In one embodiment, a manual changeover of the blow molding machine 3 at a working area is recommended only in case the efforts for an automatic changeover of the blow molding machine 3 would be too huge at this working area. Whether the changeover of the blow molding machine 3 is carried out automatically and/or manually at each working area 15, 16, 17 should not be regarded as limiting the invention.

Figure 2:
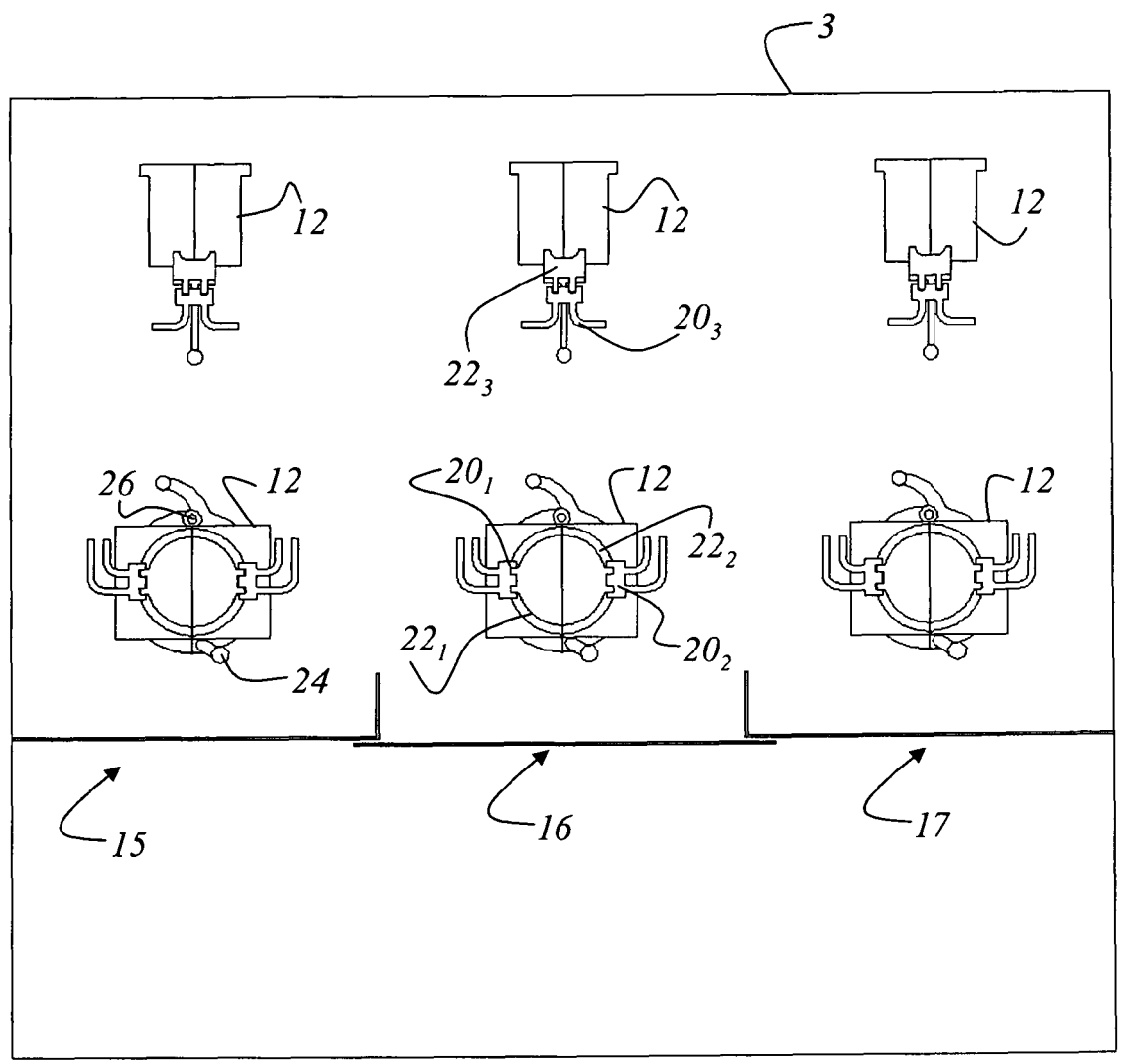
FIG. 2 shows a schematic view of the three working areas at which the processes for exchanging the blow molds are carried out.

FIG. 2 shows a schematic view, where the blow mold holders 12, which are arranged inside the blow molding machine 3, are assigned to the corresponding working areas 15, 16, 17, so that a changeover of the blow molding machine 3 can be carried out. For a better clarification of the method, the blow mold holder 12 is shown both from above and from a lateral view in the views of FIGS. 2 to 7. The blow mold holder 12 is designed in a multi-part way and thus carries the multi-part blow mold 22, which consists of a first part of the blow mold $22_1$, a second part of the blow mold $22_2$, and a third part of the blow mold $22_3$ in the embodiment shown. The third part of the blow mold $22_3$ is the base part which finally is the base part of the plastic bottle to be produced. The first part of the blow mold $22_1$ is connected with a corresponding media supply $20_1$. Likewise, the second part of the blow mold $22_2$ is connected with a corresponding media supply $20_2$. The third part of the blow mold $22_3$, too, is connected with a corresponding media supply $20_3$. Since the blow mold holder 12 is formed proportionally, a closure element 24 is provided for locking the blow mold holder 12. After the closure element 24 has been released, the blow mold holder 12 can be separated. For the separation of the blow mold holder 12, blow mold holder 12 can be swung apart about an axis 26. With reference to the procedural step shown in FIG. 2 the transport device 4 of the blow molding machine had been controlled in such a way that in each case a blow mold holder faces each working area 15, 16, 17. The blow mold holders 12 shown in FIG. 2 are all still closed.

In the following, the individual procedural steps concerning the changeover of a blow molding machine 3 are described without naming the individual elements of the blow mold holder in order to preserve clarity of the following figures.

Figure 3:
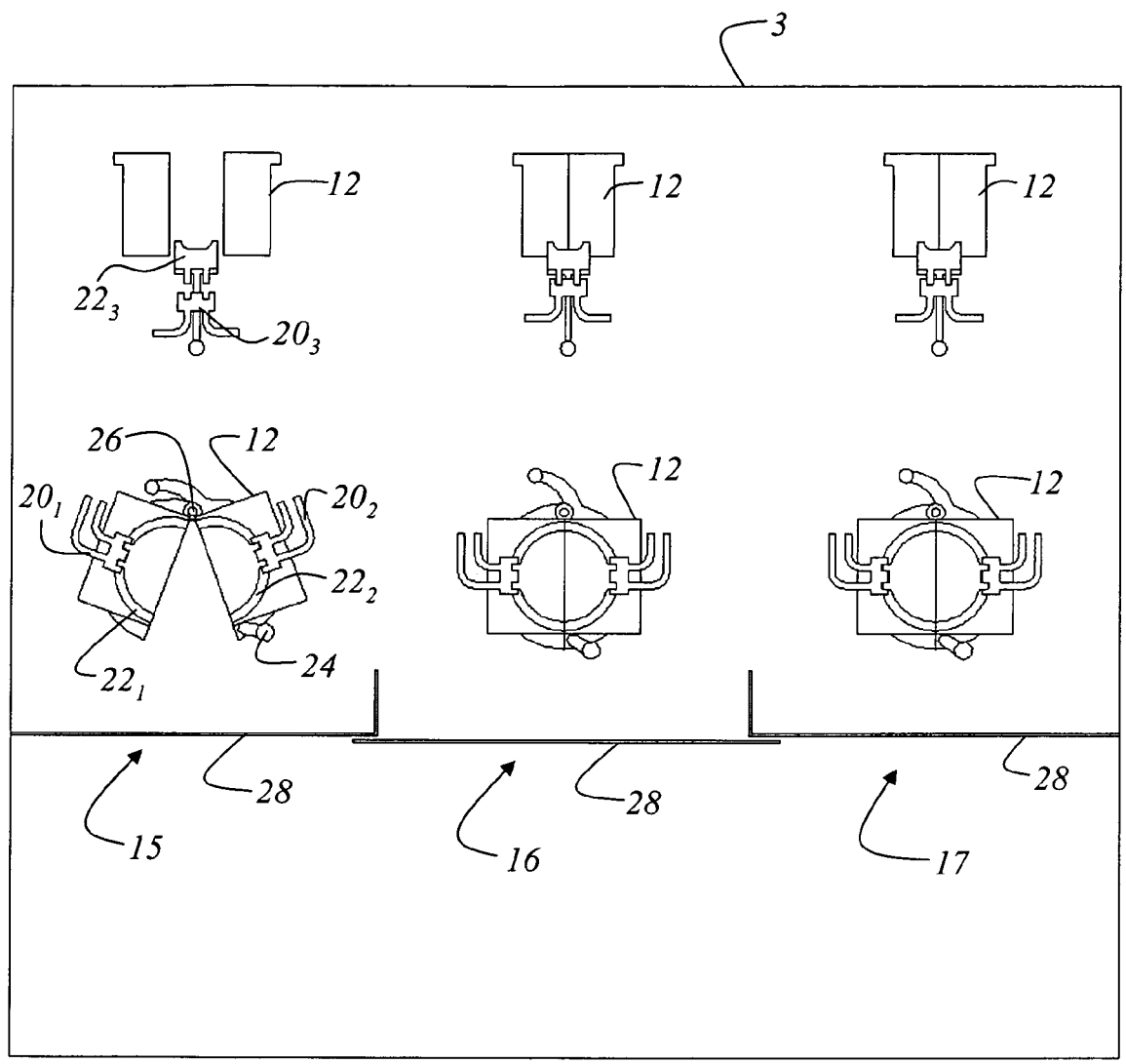
FIG. 3 shows a schematic view of a first working area at which the changeover of the blow molding machine had already begun.

FIG. 3 shows a situation of the method according to the invention for changeover of a blow molding machine 3 in which the blow mold holder 12 has been swung apart about an axis 26 at the first working area 15. Furthermore, the corresponding media supplies $20_1$, $20_2$ and $20_3$ have been released from the corresponding parts of the blow mold $22_1$, $22_2$, and $22_3$ at this first working area 15. It can also be seen from FIG. 3 that each of the working areas 15, 16, 17 is provided with a corresponding shield 28. This shield 28 is provided because of working safety.

Figure 4:
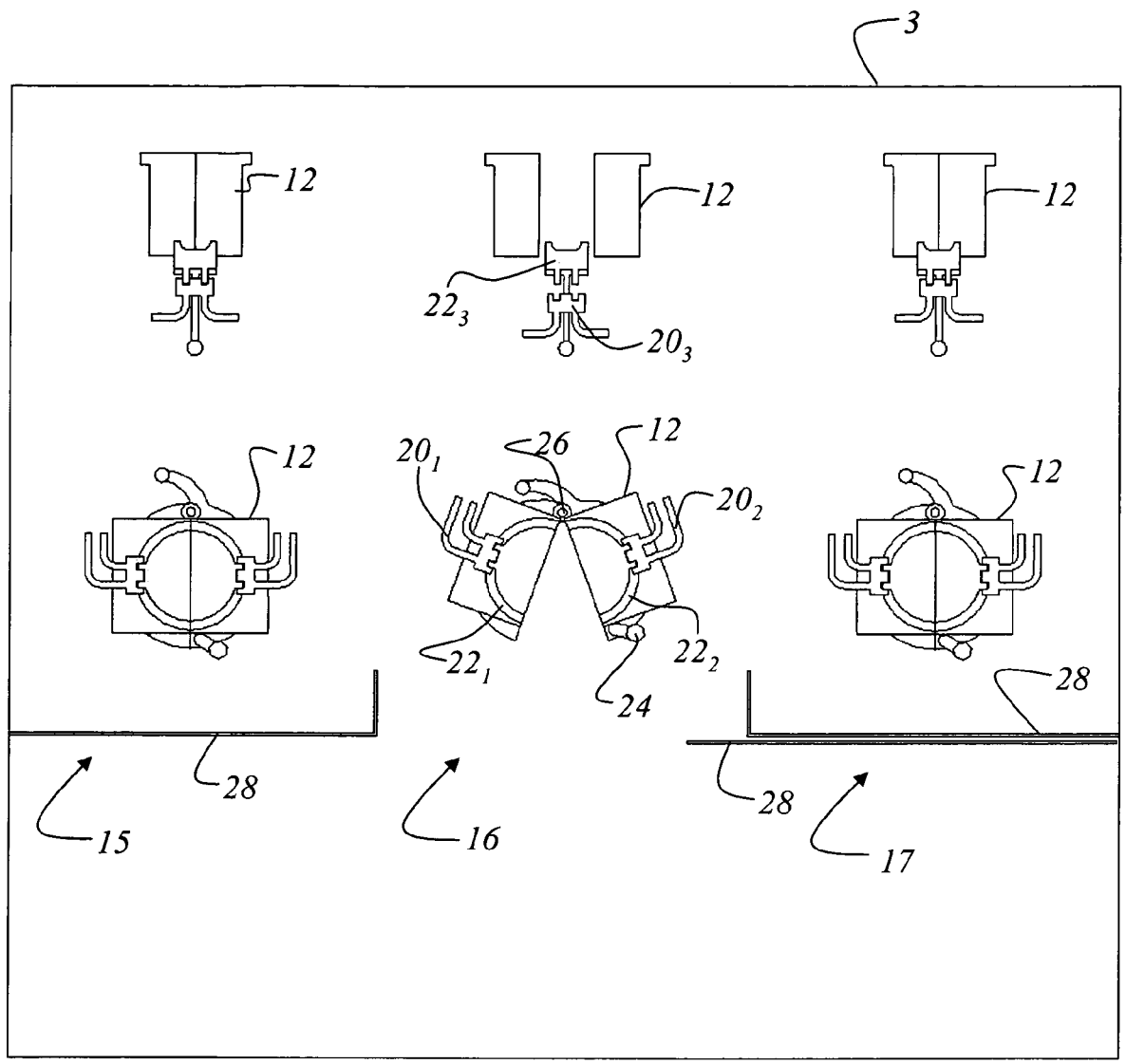
FIG. 4 shows the situation of the changeover of the blow molding machine, in which the blow mold holder, which had already been opened at the first working area, has been transported to the second working area.

FIG. 4 shows such a situation of the method according to the invention for changeover of a blow molding machine 3 in which the transport device 4 of the blow molding machine 3 has transported the blow mold holders 12 to the next working area. In FIG. 4, the opened blow mold holder, which has been opened in the first working area 15, is now situated at the second working area 16. In order to exchange the parts of the blow mold $22_1$, $22_2$, and $22_3$ at the second working area 16, the shield 28 of the second working area 16 is being removed and pushed aside respectively. The blow mold holder 12, which is situated in the second working area 16, is thus ready for a manual or automatic handling of the process for changeover of a blow molding machine 3.

Figure 5:
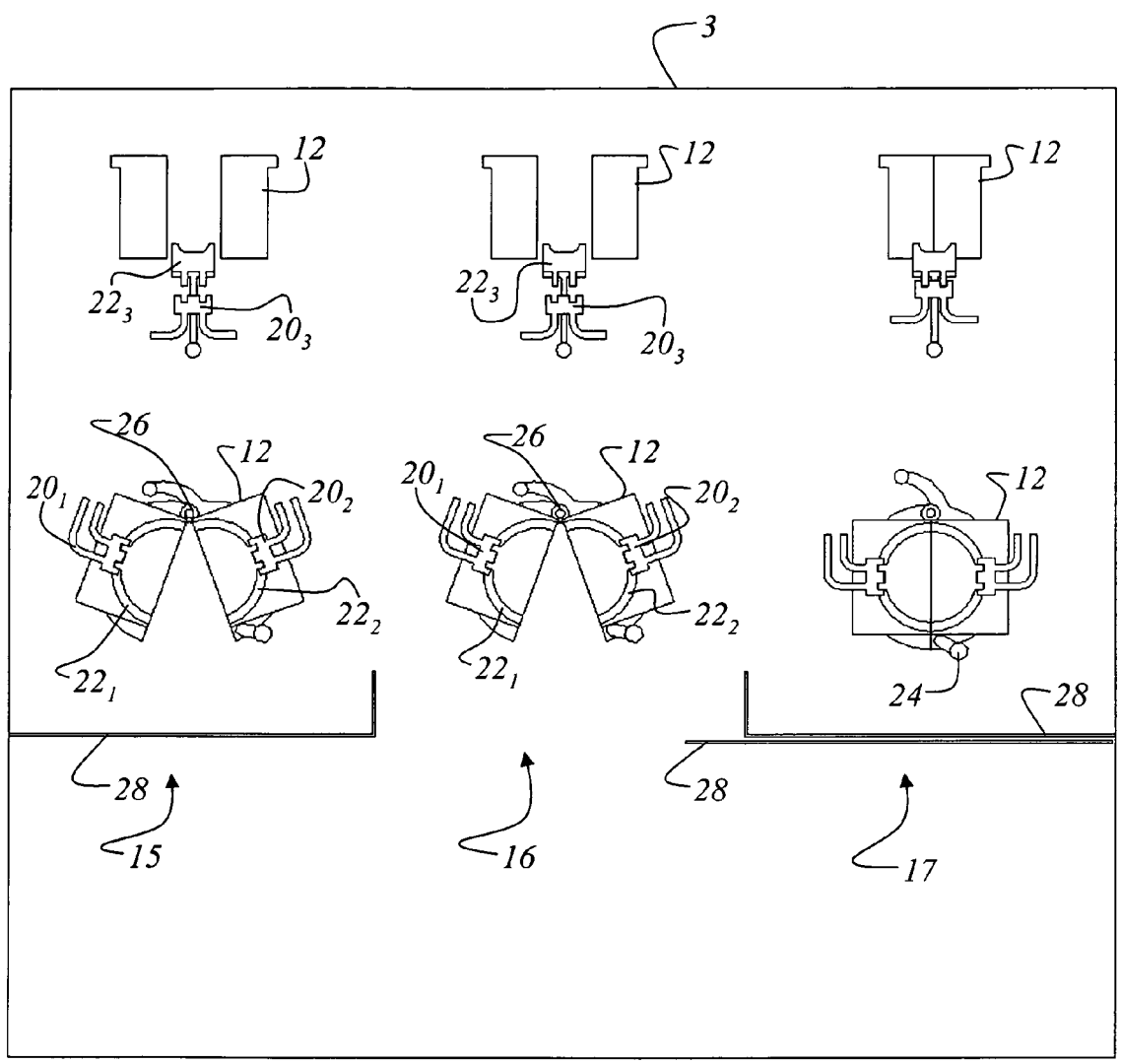
FIG. 5 shows the situation in which the newly arrived blow mold holder is opened at the first working area, and the blow molds and the blow mold part respectively is exchanged at the second working area at the same time.

FIG. 5 shows such a situation of the method according to the invention for changeover of a blow molding machine 3 in which processes are carried out at the blow mold holder 12 for changeover of a blow molding machine 3 at the first working area 15 and at the second working area 16 each. While the individual parts of the blow mold $22_1$, $22_2$, and $22_3$ are being replaced at the second working area 16, the blow mold holder 12 is being opened at the first working area 15 and the media supplies $20_1$, $20_2$ and $20_3$ are being released. The shield 28 prior to the second working area 16 is removed in order to enable the exchange of the parts of the blow mold $22_1$, $22_2$, and $22_3$. It is of particular advantage when the expenditure of time for carrying out the processes in the first working area 15 is approximately equal with the expenditure of time for carrying out the processes in the second working area.

Figure 6:
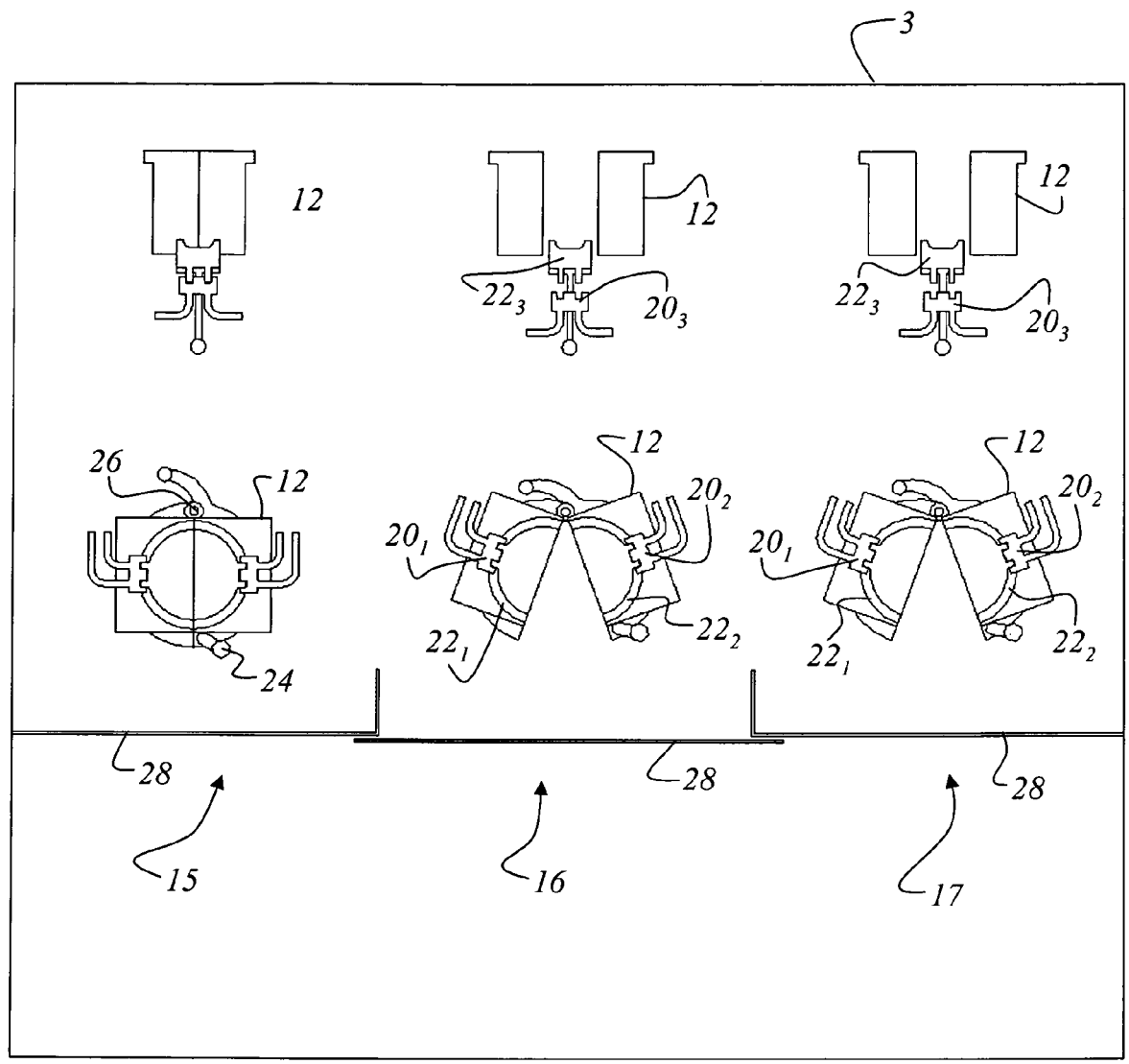
FIG. 6 shows the situation in which the blow mold holder, which is provided with new blow mold parts, has been transported to the third working area.

FIG. 6 shows a situation of the method according to the invention for changeover of a blow molding machine 3 in which the blow mold holder 12, which had faced the second working area 16 in FIG. 5, has now been transported to the third working area 17. Further transport of the blow mold holders 12 from one working area to the next working area is carried out only if the processes are finished at each working area 15, 16 and 17. Consequently it is evident that the cycle time of the transport device 4 has to act in accordance with that working area which needs the longest expenditure of time for carrying out the processes. The optimal situation would be if the expenditure of time was of the same length at each working area for carrying out the required processes. This would result in an optimal usage of the dead time of the blow molding machine 3. In the situation shown in FIG. 6 of the method according to the invention for changeover of a blow molding machine 3, a new and still closed blow mold holder 12 has been inserted at the first working area 15 by the transport device 11. The opened blow mold holder 12 has arrived at the second working area 16, and from said blow mold holder 12 now the parts of the blow mold $22_1$, $22_2$, and $22_3$ must be exchanged The opened blow mold holder 12 arrived at the third working area carrying now another type of the blow mold 22 or parts of the blow mold $22_1$, $22_2$, and $22_3$. Furthermore, the media supplies $20_1$, $20_2$ and $20_3$ are still not connected with the parts of the blow mold $22_1$, $22_2$, and $22_3$ at the third working area 17.

Figure 7:
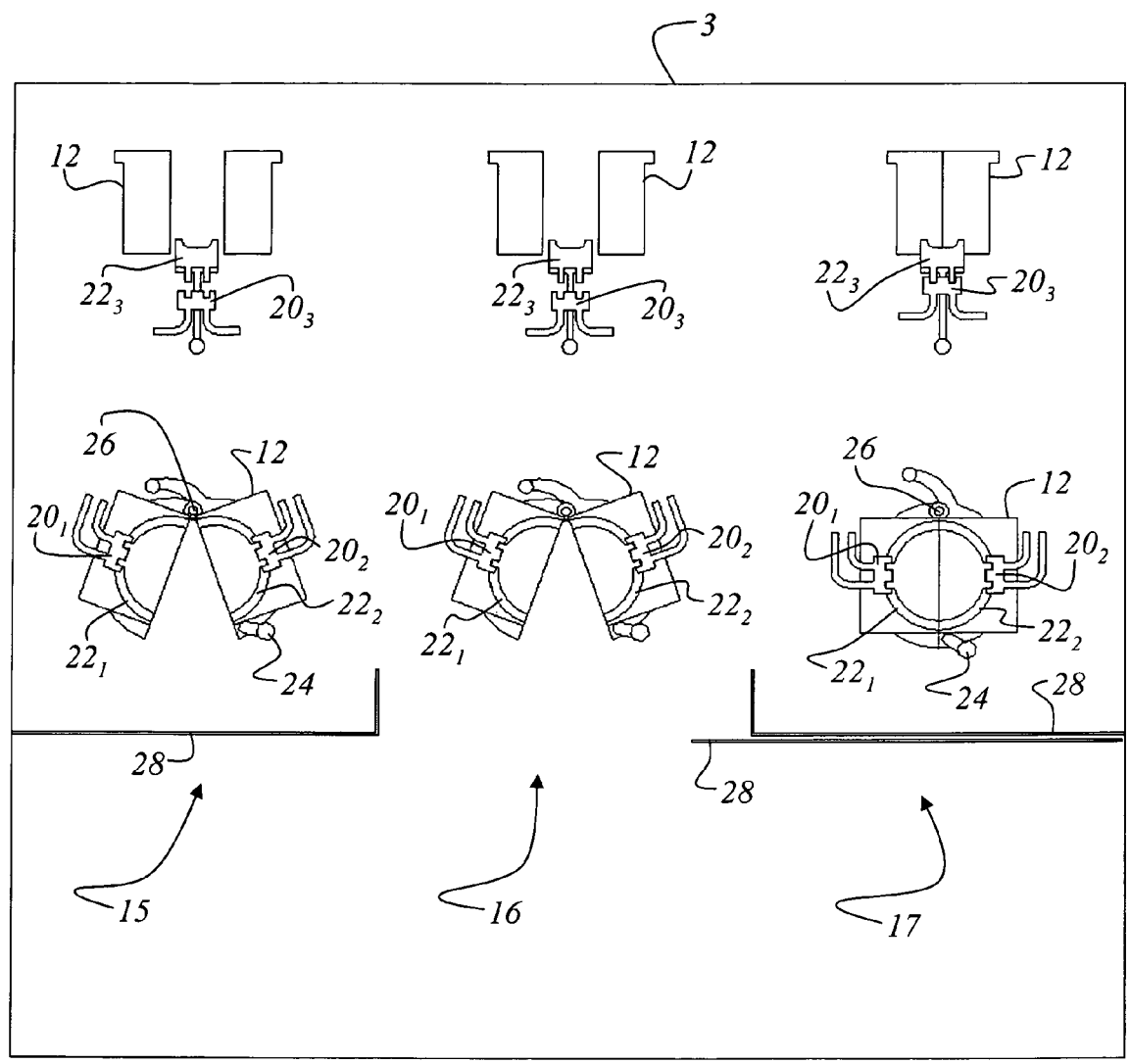
FIG. 7 shows the situation in which the blow mold holder has been closed again at the third working area.

FIG. 7 shows such a situation of the method according to the invention for changeover of a blow molding machine 3 in which at all working areas 15, 16, 17 processes are being carried out. A blow mold holder 12 is being opened at the first working area 15. For this purpose, a closure element 24 is released and the blow mold holder is swung about the axis 26 and consequently separated. Likewise, the media supplies $20_1$, $20_2$ and $20_3$ are released from the corresponding parts of the blow mold $22_1$, $22_2$, and $22_3$. Simultaneously the shield 28 is opened at the second working area 16 and the parts of the blow mold $22_1$, $22_2$, and $22_3$ are exchanged with other blow mold parts of another type. At the third working area 17 processes for changeover of a blow molding machine 3 are also carried out at the same time with the processes being carried out at the first working area 15 and at the second working area 16 simultaneously. At the third working area 17, the blow mold holder 12 is flapped about the axis 26 and closed with the closure element 24. Likewise, the media supplies $20_1$, $20_2$ and $20_3$ are reconnected with the corresponding blow mold parts. The transport device 4 of the blow molding machine 3 transports blow mold holders 12 till such time to the corresponding working areas 15, 16, 17 as long as all blow mold holders 12, which are available in the blow molding machine 3, have a new blow mold type. By means of the method according to the invention, the resulting dead time owing to the changeover of the blow molding machine 3 is reduced to a minimum (20 to 60 minutes for example).

The present invention has been described with respect to preferred embodiments. It is possible for a skilled person to carry out amendments or changes of the present invention without departing from the scope of the claims below.

What is claimed is:

1. A method for changeover of a blow molding machine wherein the blow molding machine has a plurality of blow mold holders, each of which carries a multi-part blow mold, comprising the steps of:
   assigning at least two working areas at the blow molding machine, wherein different processes are carried out at each working area;
   opening, at a first working area, one of the plurality of blow mold holders;
   removing, at at least one second working area, the multi-part blow mold from the blow mold holder and replacing the multi-part blow mold with a blow mold of another type; and
   closing the blow mold holder.

2. The method as defined in claim 1, further comprising assessing an expenditure of time for carrying out the processes at the plurality of working areas is in such a way that the expenditure of time is equal at each working area.

3. The method as defined in claim 1, wherein opening and/or closing of the blow mold holder is carried out by means of a cam element.

4. The method as defined in claim 1, wherein the different processes are carried out automatically at each working area.

5. The method as defined in claim 1, wherein various processes are carried out automatically at the first and at least one second working area, except the removal of the multi-part blow mold and the replacement of the multi-part blow mold is carried out manually.

6. The method as defined in claim 1, wherein the removal and the replacement of the multi-part blow mold from the blow mold holder comprises further steps:
   releasing a locking device for the multi-part blow mold;
   removing the multi-part blow mold from the blow mold holders;
   inserting the blow mold of another type in the blow mold holder; and
   closing the locking device for the multi-part blow mold.

7. The method as defined in claim 1, wherein the processes at different working areas are carried out simultaneously and wherein the exchange of the blow mold holders from one working area to the next working area is timed in such a way that a cycle time complies with the longest expenditure of time needed at a working area.

8. The method as defined in claim 7, wherein the blow mold holders are arranged on a transport device and wherein said transport device moves said blow mold holders between the working areas according to the cycle time.

9. The method as defined in claim 8, wherein the transport device is partially linear.

10. The method as defined in claim 8, wherein the transport device is designed in the shape of a wheel on which the plurality of blow mold holders is arranged.

11. The method as defined in claim 1, wherein at the working area at which the blow mold of another type is being inserted, a first blow mold half, a second blow mold half and a base part of the blow mold are exchanged and wherein the blow mold of another type is of the same height.

12. The method as defined in claim 1, wherein at the working area at which the blow mold of another type is being inserted, a first blow mold half, a second blow mold half, a base part of the blow mold and a stop for the stretching rod are being exchanged, wherein the blow mold of another type is of a different height.

13. Method as defined in claim 1, wherein at least one part of the multi-part blow mold and/or the blow mold holder are connectable to at least one media supply and wherein releasing and reconnecting of the media supply is carried out at the at least two working areas.

14. The method as defined in claim 13, wherein an expenditure of time at the first working area for opening the blow mold holders and/or for releasing the media supply, corresponds substantially with both an expenditure of time for removing the parts of the blow mold and replacing the blow mold at the second working area, and an expenditure of time for closing the blow mold holder and/or with the connection of the media supply.

15. A method for changeover of a blow molding machine wherein the blow molding machine has a plurality of blow mold holders, each of which carries a multi-part blow mold, comprising the steps of:
   opening at a first working area one of the plurality of blow mold holders;
   removing at a second working area the multi-part blow mold from the blow mold holder and replacing the parts of the multi-part blow mold with a blow mold of another type; and closing at a third working area the blow mold holder.

16. Method as defined in claim 15, wherein at least one part of the multi-part blow mold and/or the blow mold holder are connectable to at least one media supply and wherein releasing and reconnection of the media supply is carried out at the first working area and the third working area respectively.

17. Method as defined in claim 16, wherein the expenditure of time at the first working area for opening the blow mold holders and/or for releasing the media supply, corresponds substantially with the expenditure of time for removing the parts of the multi-part blow mold and replacing the multi-part blow mold at the second working area, and the expenditure of time for closing the blow mold holder and/or for reconnecting the media supply at the third working area.

18. A method for changeover of a blow molding machine wherein the blow molding machine has a plurality of blow mold holders, each of which carries a multi-part blow mold and wherein at least one part of the blow mold and/or the blow mold holder are connectable to at least one media supply comprising the steps of:
   opening at a first working area one of the plurality of blow mold holders and releasing the at least one media supply;

removing at a second working area the parts of the multi-part blow mold from the blow mold holder and replacing the parts of the multi-part blow mold with a blow mold of another type; and closing at a third working area the blow mold holder and reconnecting the at least one media supply.

19. Method as defined in claim 18, wherein the expenditure of time at the first working area for opening the blow mold holders and for releasing the media supply, corresponds substantially with the expenditure of time for removing the parts of the multi-part blow mold and replacing the multi-part blow mold at the second working area, and the expenditure of time for closing the blow mold holder and for reconnecting the media supply at the third working area.

\* \* \* \* \*